US007068118B2

(12) United States Patent
Kii et al.

(10) Patent No.: US 7,068,118 B2

(45) Date of Patent: Jun. 27, 2006

(54) PULSE MODULATOR FOR NONRADIATIVE DIELECTRIC WAVEGUIDE, AND MILLIMETER WAVE TRANSMITTER/RECEIVER USING THE SAME

(75) Inventors: Hironori Kii, Kyoto (JP); Nobuki Hiramatsu, Kyoto (JP)

(73) Assignee: Kyocera Corporation, Kyoto (JP)

( * ) Notice: Subject to any disclaimer, the term of this patent is extended or adjusted under 35 U.S.C. 154(b) by 1043 days.

(21) Appl. No.: 10/061,881

(22) Filed: Jan. 30, 2002

(65) Prior Publication Data

US 2002/0101295 A1 Aug. 1, 2002

(30) Foreign Application Priority Data

Jan. 31, 2001 (JP) ........................... P2001-022711

(51) Int. Cl.
*H04B 1/26* (2006.01)
*H04M 1/00* (2006.01)

(52) U.S. Cl. ............................ 333/1; 455/81; 455/328; 333/113; 333/239; 333/248

(58) Field of Classification Search ............. 455/550.1, 455/81, 106, 318, 326, 328; 333/1.1, 100–137, 333/239, 248
See application file for complete search history.

(56) References Cited

U.S. PATENT DOCUMENTS 5,640,700 A * 6/1997 Shingyoji et al. ........... 455/328
5,781,086 A * 7/1998 Kato et al. ................... 333/248
5,867,120 A * 2/1999 Ishikawa et al. ............ 342/175
5,920,245 A * 7/1999 Ishikawa et al. ............ 333/248
5,982,255 A * 11/1999 Tanizaki et al. ............ 333/239
6,034,574 A * 3/2000 Sato ........................... 332/164
6,144,267 A * 11/2000 Saitoh et al. ................. 333/34
6,369,662 B1 * 4/2002 Haruta et al. ........... 331/107 G
6,630,870 B1 * 10/2003 Kii et al. ....................... 331/96
6,744,402 B1 * 6/2004 Kii et al. ..................... 342/200
6,832,081 B1 * 12/2004 Hiramatsu et al. .......... 455/328

FOREIGN PATENT DOCUMENTS

DE 1 954 286 5/1971
JP 2000-258525 9/2000

OTHER PUBLICATIONS

Kuroki, F., et al., "High-Speed PCM Transceiver based on the NRD-guide technologies at 60-GHz band" in: Topical Symposium on Millimeter Waves, 1997, publication date Jul. 7-8, 1997, pp. 119-122.
Futoshi Kuroki et al., "High-Speed ASK Transceiver Based on the NRD-Guide Technology at 60-GHz Band", IEEE Transaction on Microwave Theory and Techniques, vol. 46, No. 6, Jun. 1998, pp. 806-810.

* cited by examiner

*Primary Examiner*—Simon Nguyen
(74) *Attorney, Agent, or Firm*—Hogan & Hartson, LLP

(57) ABSTRACT

A pulse modulator includes a circulator which comprises: two ferrite plates; a plurality of mode suppressors for transmitting therethrough an LSM mode electromagnetic wave while shutting off an LSE mode electromagnetic wave; and an impedance matching member mounted on one end face of each of the mode suppressors, wherein a pulse modulation switch having a Schottky barrier diode is mounted on the other end face of any one of the mode suppressors in such a manner that the direction of application of a bias voltage to the Schottky barrier diode coincides with the direction of electric field of the LSM mode electromagnetic wave, and wherein the distance from an edge of the ferrite plates to the Schottky barrier diode is set approximately equal to $n\lambda/2$. Herein, n is an integer not smaller than 1, and $\lambda$ is the wavelength of the high frequency signal.

17 Claims, 7 Drawing Sheets

PULSE MODULATOR FOR NONRADIATIVE DIELECTRIC WAVEGUIDE, AND MILLIMETER WAVE TRANSMITTER/RECEIVER USING THE SAME

BACKGROUND OF THE INVENTION

1. Field of the Invention

The present invention relates to a pulse modulator, incorporated in a millimeter wave integrated circuit, a millimeter wave radar module of nonradiative dielectric waveguide type, or the like, for modulating a millimeter wave signal by ASK (Amplitude Shift Keying) or like modulation scheme, and also relates to a millimeter wave transmitter/receiver of nonradiative dielectric waveguide structure using the same.

2. Description of the Related Art

FIG. 8 shows the basic structure of a prior art nonradiative dielectric waveguide (hereinafter called the NRD guide) for transmitting therethrough a high frequency signal in the microwave or millimeter wave region. As shown, the structure comprises a dielectric waveguide 13 of rectangular or square cross section that is placed between parallel plate conductors 11 and 12 arranged in parallel to each other with a prescribed gap "a" provided therebetween. If this gap "a" satisfies the relation $a \leqq \lambda/2$, the high frequency signal can be propagated through the dielectric waveguide 13 while preventing noise from entering the dielectric waveguide 13 from the outside and also preventing the radiation of the high frequency signal to the outside. Here, the wavelength $\lambda$ of the high frequency signal is the wavelength in the air (free space) at the operating frequency.

FIG. 9A shows a perspective view of a pulse modulator to be incorporated in such an NRD guide, and FIG. 9B shows a plan view when the structure is viewed from above (refer to IEEE TRANSACTIONS ON MICROWAVE THEORY AND TECHNIQUES, VOL. 46, NO. 6, JUNE 1998, pp. 806–810, "High-Speed ASK Transceiver Based on the NRD-Guide Technology at 60-GHz Band" (Futoshi Kuroki et al.)).

As shown, the pulse modulator comprises mode suppressors 20*a*, 20*b*, and 20*c*, two ferrite disks 21 for a circulator, and strip line conductors 22. The mode suppressors 20*a*, 20*b*, and 20*c* are each constructed from a dielectric waveguide made of Teflon (E. I. DU PONT DE MEMOURS AND COMPANY, Trademark; polytetrafluoroethylene), polystyrene, or like material, and shut off LSE (Longitudinal Section Electric) mode electromagnetic waves. The mode suppressors 20*a*, 20*b*, and 20*c* are arranged extending radially and spaced 120 degrees apart around the two ferrite disks 21 for the circulator. The strip line conductors 22, made of copper foil or the like, are formed inside the respective mode suppressors 20*a*, 20*b*, and 20*c*, and shut off LSE mode electromagnetic waves in which the direction of the electric field is perpendicular to the principal surfaces of the parallel plate conductors (in FIG. 9A, the direction from top to bottom). Each strip line conductor 22 is formed with a $\lambda/4$ choke pattern in order to eliminate TEM (Transverse ElectroMagnetic) mode.

At the opposite end of the mode suppressor 20*b* from the end connected to the ferrite disks, a dielectric waveguide 23*a* made of Teflon, polystyrene, or like material is disposed with a prescribed gap provided between it and that opposite end, and there is also disposed a dielectric sheet 24 made of alumina ceramics or like material having a different dielectric constant from that of the dielectric waveguide.

Behind the dielectric sheet 24 is disposed a dielectric wiring substrate 27 on which a strip line conductor 25 made of copper foil or the like is printed, with a Schottky barrier diode 26 mounted at an intermediate point along the strip line conductor 25 of choke-type bias supply line structure. A dielectric waveguide 23*b* made of Teflon, polystyrene, or like material is disposed behind the dielectric wiring substrate 27.

In the above structure, an electromagnetic wave propagated through the mode suppressor 20*a* is passed between the ferrite disks 21 where the wavefront is rotated in the clockwise direction so that the electromagnetic wave is directed into the mode suppressor 20*b*, not into the mode suppressor 20*c*. Then, the electromagnetic wave propagated through the mode suppressor 20*b* is absorbed at the Schottky barrier diode 26 on the dielectric wiring substrate 27 when a forward bias is applied to the Schottky barrier diode 26, but reflected when no bias or a reverse bias is applied to it.

The electromagnetic wave reflected by the Schottky barrier diode 26 is propagated back through the mode suppressor 20*b* and passed between the ferrite disks 21 where the wavefront is rotated in the clockwise direction so that the electromagnetic wave is directed into the mode suppressor 20*c*. In this way, by applying a bias voltage to the Schottky barrier diode 26, ASK modulation can be applied to the electromagnetic wave.

In the prior art pulse modulator for the NRD guide, however, since impedance matching is achieved for operation at the desired frequency by controlling the gap between the mode suppressor 20*b* and the dielectric waveguide 23*a*, the lengths of the dielectric waveguides 23*a* and 23*b*, and the thickness of the dielectric sheet 24, if there occurs a positional displacement among them or a manufacturing accuracy of them is low, the operating frequency may be displaced, degrading ASK modulation characteristics at the desired frequency. That is, the manufacturing accuracy and the positioning accuracy of these components have been difficult to manage, and this, coupled with poor fabrication reproducibility, has lead to low manufacturing efficiency; hence, the prior art has had the problem that it cannot ensure high reliability, nor is it suitable for mass production.

Furthermore, since the prior art pulse modulator for the NRD guide employs the structure in which the dielectric wiring substrate 27 with the Schottky barrier diode 26 mounted thereon is sandwiched between the dielectric sheet 24 and the dielectric waveguide 23*b* as shown in FIG. 9B, the prior art has had the problem that during fabrication the dielectric waveguide 23*b* may accidentally touch the Schottky barrier diode 26, damaging the Schottky barrier diode 26.

If such a pulse modulator is used for a millimeter wave transmitter/receiver, since ASK modulation is insufficient, there occurs the problem that millimeter wave isolation characteristics degrade and, when it is applied to a millimeter wave radar or the like, accurate detection becomes difficult.

SUMMARY OF THE INVENTION

The invention has been devised in view of the above situation, and an object of the invention is to provide a pulse modulator wherein improvements are made to increase the fabrication reproducibility of the pulse modulator and facilitate impedance matching for operation at the desired frequency so that the characteristics of the pulse modulator can be obtained stably and with good reproducibility, thereby achieving a pulse modulator easy to manufacture and suitable for mass production.

The invention provides a pulse modulator for a nonradiative dielectric waveguide, comprising: parallel plate conductors one separated from the other by a distance not greater than one half wavelength of a high frequency signal; a circulator placed between the parallel plate conductors, the circulator including two ferrite plates disposed opposite each other on inner surfaces of the parallel plate conductors, a plurality of mode suppressors, each constructed from a dielectric waveguide for transmitting therethrough an LSM mode electromagnetic wave while shutting off an LSE mode electromagnetic wave, and arranged in such a manner as to extend substantially radially from the two ferrite plates, and an impedance matching member mounted on one end face of each of the mode suppressors and having a dielectric constant different from that of the dielectric waveguide; and a pulse modulation switch constructed from a Schottky barrier diode connected at an intermediate point along a choke-type bias supply line formed on a dielectric wiring substrate, the pulse modulation switch being mounted on the other end face of any one of the mode suppressors in such a manner that a direction of application of a bias voltage to the Schottky barrier diode coincides with a direction of electric field of the LSM mode electromagnetic wave, wherein the distance from an edge of the ferrite plates to the Schottky barrier diode is set approximately equal to $n\lambda/2$ (n is an integer not smaller than 1, and $\lambda$ is the wavelength of the high frequency signal).

According to the invention, since the impedance matching for enabling operation at the desired frequency is achieved by controlling the distance from the ferrite plates to the Schottky barrier diode, the need for the gap or the dielectric sheet required in the prior art is eliminated, thus reducing the number of components used and enhancing fabrication reproducibility. Further, since the impedance matching for enabling operation at the desired frequency can be easily achieved, the characteristics of the pulse modulator can be obtained stably and with good reproducibility. The pulse modulator of the invention is therefore easy to manufacture and has high reliability.

Furthermore, since there is no need to provide a gap between the mode suppressor and the Schottky barrier diode as in the prior art, component positioning is greatly simplified, and the pulse modulator can be produced stably and with good reproducibility, thereby the mass producibility is greatly improved.

In the invention it is preferable that an intermediate dielectric waveguide having substantially the same width as that of the mode suppressor is placed between the mode suppressor and the pulse modulation switch.

According to the invention, there is offered the effect of providing greater freedom in controlling the distance from the ferrite plates to the Schottky barrier diode, and making it possible to readily adapt to operations at various desired frequencies.

In the invention it is preferable that the dielectric waveguide and the impedance matching member have a relation defined by $-10 \leqq (\epsilon r2 - \epsilon r1) \leqq 20$ ($\epsilon r1 \neq \epsilon r2$), where $\epsilon r1$ is the dielectric constant of the dielectric waveguide and $\epsilon r2$ is the dielectric constant of the impedance matching member.

In the invention it is preferable that a thickness of the impedance matching member, measured along a direction of transmission of the high frequency signal, is 0.05 mm to 0.5 mm.

In the invention it is preferable that the impedance matching member is formed of at least one selected from the group consisting of alumina ceramics, forsterite ceramics, spinel ceramics, mullite ceramics, and silicon nitride ceramics.

The invention also provides a millimeter wave transmitter/receiver, wherein, between parallel plate conductors one separated from the other by a distance not greater than one half wavelength of a millimeter wave signal to be transmitted, there are provided:

a first dielectric waveguide for propagating the millimeter wave signal therethrough;

a millimeter wave signal oscillator, attached to the first dielectric waveguide, for generating the millimeter wave signal using a high frequency generating device, and for propagating the millimeter wave signal into the first dielectric waveguide;

a second dielectric waveguide whose one end is electromagnetically coupled by proximity to the first dielectric waveguide, or is joined to the first dielectric waveguide, thereby propagating a portion of the millimeter wave signal into a mixer;

a circulator having a first connection part, a second connection part, and a third connection part provided as input/output ends for the millimeter wave signal and arranged at prescribed intervals around ferrite plates mounted parallel to the parallel plate conductors, the circulator having a function of directing the millimeter wave signal inputted through one of the connection parts, into another one of the connection parts that is adjacent in clockwise or counterclockwise direction in a plane of the ferrite plates, wherein the first connection part is connected to the output end of the first dielectric waveguide at which the millimeter wave signal is outputted;

a third dielectric waveguide, connected to the second connection part of the circulator, for propagating the millimeter wave signal therethrough, the third dielectric waveguide having a transmitting/receiving antenna at an end portion thereof;

a fourth dielectric waveguide for propagating into the mixer a received wave received by the transmitting/receiving antenna, propagated through the third dielectric waveguide, and outputted through the third connection part of the circulator; and a mixer section for generating an intermediate frequency signal by mixing the portion of the millimeter wave signal with the received wave, the mixer section being constructed by electromagnetically coupling an intermediate portion of the second dielectric waveguide by proximity to an intermediate portion of the fourth dielectric waveguide or by joining the second and fourth dielectric waveguides together, wherein the pulse modulator of the aforementioned configuration is placed between the circulator and a signal coupling portion of the first dielectric waveguide from which the portion of the millimeter wave signal is coupled into the second dielectric waveguide.

The invention further provides a millimeter wave transmitter/receiver, comprising:

a pair of parallel plate conductors one separated from the other by a distance not greater than one half wavelength of a millimeter wave signal to be transmitted;

a first dielectric waveguide for propagating the millimeter wave signal therethrough;

a millimeter wave signal oscillator, attached to the first dielectric waveguide, for generating the millimeter wave signal using a high frequency generating device, and for propagating the millimeter wave signal into the first dielectric waveguide;

a second dielectric waveguide whose one end is electromagnetically coupled by proximity to the first dielectric waveguide, or is joined to the first dielectric waveguide, thereby propagating a portion of the millimeter wave signal into a mixer;

a pulse modulator for a nonradiative dielectric waveguide, including:

a first circulator constructed with two ferrite plates disposed opposite each other on inner surfaces of the parallel plate conductors, a plurality of mode suppressors, each constructed from a dielectric waveguide for transmitting therethrough an LSM mode electromagnetic wave while shutting off an LSE mode electromagnetic wave, and arranged in such a manner as to extend substantially radially from the two ferrite plates, and an impedance matching member mounted on one end face of each of the mode suppressors and having a dielectric constant different from that of the dielectric waveguide, the first circulator having a function of directing the millimeter wave signal inputted from one of the mode suppressors, into another one of the mode suppressors that is adjacent in clockwise or counterclockwise direction in a plane of the ferrite plates, and a pulse modulation switch comprising a dielectric wiring substrate, a choke-type bias supply line formed on the dielectric wiring substrate, and a Schottky barrier diode connected to an intermediate point of the choke-type bias supply line, wherein the first dielectric waveguide is connected to a first mode suppressor of the plurality of mode suppressors of the first circulator at a position on the downstream side, as viewed in signal propagation direction, of a signal coupling portion where the portion of the millimeter wave signal is coupled into the second dielectric waveguide, and the pulse modulation switch is mounted on the farthest end face of a second mode suppressor of the plurality of mode suppressors of the first circulator in such a manner that a direction of application of a bias voltage to the Schottky barrier diode coincides with a direction of electric field of the LSM mode electromagnetic wave, and that the distance from an edge of the ferrite plates to the Schottky barrier diode is approximately equal to $n\lambda/2$ (n is an integer not smaller than 1, and $\lambda$ is the wavelength of the high frequency signal);

a second circulator constructed with two ferrite plates disposed opposite each other on the inner surfaces of the parallel plate conductors, a plurality of mode suppressors, each constructed from a dielectric waveguide for transmitting therethrough an LSM mode electromagnetic wave while shutting off an LSE mode electromagnetic wave, and arranged in such a manner as to extend substantially radially from the two ferrite plates, and an impedance matching member mounted on one end face of each of the mode suppressors and having a dielectric constant different from that of the dielectric waveguide, the second circulator having a function of directing the millimeter wave signal inputted from one of the mode suppressors, into another one of the mode suppressors that is adjacent in clockwise or counterclockwise direction in the plane of the ferrite plates, wherein one of the plurality of mode suppressors of the second circulator is a third mode suppressor of the plurality of mode suppressors of the first circulator;

a transmitting/receiving antenna, connected to a fourth mode suppressor of the plurality of mode suppressor of the second circulator, for propagating the millimeter wave signal therethrough for transmission or reception of the millimeter wave signal, the fourth mode suppressor being another one of the plurality of mode suppressors of the second circulator;

a third dielectric waveguide for propagating into the mixer a received wave received by the transmitting/receiving antenna, propagated through the fourth dielectric waveguide, and outputted from a fifth mode suppressor of the plurality of mode suppressor of the second circulator, the fifth mode suppressor being another one of the plurality of mode suppressors in the second circulator; and a mixer section for generating an intermediate frequency signal by mixing the portion of the millimeter wave signal with the received wave, the mixer section being constructed by electromagnetically coupling an intermediate portion of the second dielectric waveguide by proximity to an intermediate portion of the third dielectric waveguide or by joining the second and third dielectric waveguides together, wherein the first dielectric waveguide, the millimeter wave signal oscillator, the second dielectric waveguide, the pulse modulator, the second circulator, the third dielectric waveguide, and the mixer section are arranged between the parallel plate conductors.

According to the invention, isolation characteristics for pulse modulation such as ASK modulation applied to the millimeter wave are improved, and as a result, when the invention is applied to a millimeter wave radar or the like, the detection range of the radar can be extended.

The invention also provides a millimeter wave transmitter/receiver, wherein, between parallel plate conductors one separated from the other by a distance not greater than one half wavelength of a millimeter wave signal to be transmitted, there are provided:

a first dielectric waveguide for propagating the millimeter wave signal therethrough;

a millimeter wave signal oscillator, attached to the first dielectric waveguide, for generating the millimeter wave signal using a high frequency generating device, and for propagating the millimeter wave signal into the first dielectric waveguide;

a second dielectric waveguide whose one end is electromagnetically coupled by proximity to the first dielectric waveguide, or is joined to the first dielectric waveguide, thereby propagating a portion of the millimeter wave signal into a mixer;

a circulator having a first connection part, a second connection part, and a third connection part provided as input/output ends for the millimeter wave signal and arranged at prescribed intervals around ferrite plates mounted parallel to the parallel plate conductors, the circulator having a function of directing the millimeter wave signal inputted through one of the connection parts, into another one of the connection parts that is adjacent in clockwise or counterclockwise direction in a plane of the ferrite plates, wherein the first connection part is connected to the output end of the first dielectric waveguide at which the millimeter wave signal is outputted;

a third dielectric waveguide, connected to the second connection part of the circulator, for propagating the millimeter wave signal therethrough, the third dielectric waveguide having a transmitting antenna at an end portion thereof;

a fourth dielectric waveguide having a receiving antenna at an end portion thereof and the mixer at the other end; and a mixer section for generating an intermediate frequency signal by mixing the portion of the millimeter wave signal with the received wave, the mixer section being constructed by electromagnetically coupling an intermediate portion of the second dielectric waveguide by proximity to an intermediate portion of the fourth dielectric waveguide or by joining the second and fourth dielectric waveguides together, wherein the pulse modulator of the aforementioned configuration is placed between the circulator and a signal coupling portion of the first dielectric waveguide from which the portion of the millimeter wave signal is coupled into the second dielectric waveguide.

The invention further provides a millimeter wave transmitter/receiver, comprising:

a pair of parallel plate conductors one separated from the other by a distance not greater than one half wavelength of a millimeter wave signal to be transmitted;

a first dielectric waveguide for propagating the millimeter wave signal therethrough;

a millimeter wave signal oscillator, attached to the first dielectric waveguide, for generating the millimeter wave signal using a high frequency generating device, and for propagating the millimeter wave signal into the first dielectric waveguide;

a second dielectric waveguide whose one end is electromagnetically coupled by proximity to the first dielectric waveguide, or is joined to the first dielectric waveguide, thereby propagating a portion of the millimeter wave signal into a mixer;

a pulse modulator for a nonradiative dielectric waveguide, including:

a circulator constructed with two ferrite plates disposed opposite each other on inner surfaces of the parallel plate conductors, a plurality of mode suppressors, each constructed from a dielectric waveguide for transmitting therethrough an LSM mode electromagnetic wave while shutting off an LSE mode electromagnetic wave, and arranged in such a manner as to extend substantially radially from the two ferrite plates, and an impedance matching member mounted on one end face of each of the mode suppressors and having a dielectric constant different from that of the dielectric waveguide, the circulator having a function of directing the millimeter wave signal inputted from one of the mode suppressors, into another one of the mode suppressors that is adjacent in clockwise or counterclockwise direction in a plane of the ferrite plates, and a pulse modulation switch comprising a dielectric wiring substrate, a choke-type bias supply line formed on the dielectric wiring substrate, and a Schottky barrier diode connected to an intermediate point of the choke-type bias supply line, wherein the first dielectric waveguide is connected to a first mode suppressor of the plurality of mode suppressors of the circulator at a position on the downstream side, as viewed in signal propagation direction, of a signal coupling portion where the portion of the millimeter wave signal is coupled into the second dielectric waveguide, and the pulse modulation switch is mounted on the farthest end face of a second mode suppressor of the plurality of mode suppressors of the circulator in such a manner that a direction of application of a bias voltage to the Schottky barrier diode coincides with a direction of electric field of the LSM mode electromagnetic wave, and that the distance from an edge of the ferrite plates to the Schottky barrier diode is approximately equal to $n\lambda/2$ (n is an integer not smaller than 1, and $\lambda$ is the wavelength of the high frequency signal);

a transmitting antenna, connected to a third mode suppressor of the plurality of mode suppressors of the circulator, for propagating the millimeter wave signal therethrough for transmission of the millimeter wave signal;

a third dielectric waveguide having a receiving antenna at an end portion thereof and the mixer at the other end; and a mixer section for generating an intermediate frequency signal by mixing the portion of the millimeter wave signal with the received wave, the mixer section being constructed by electromagnetically coupling an intermediate portion of the second dielectric waveguide by proximity to an intermediate portion of the third dielectric waveguide or by joining the second and third dielectric waveguides together, wherein the first dielectric waveguide, the millimeter wave signal oscillator, the second dielectric waveguide, the pulse modulator, the third dielectric waveguide, and the mixer section are arranged between the parallel plate conductors.

According to the invention, isolation characteristics for pulse modulation such as ASK modulation applied to the millimeter wave signal are improved, and the millimeter wave signal for transmission is prevented from being introduced into the mixer via the circulator; therefore, when the invention is applied to a millimeter wave radar module, noise in the received signal reduces and the detection range increases, so that the detection range of the millimeter radar can be further extended.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1A:
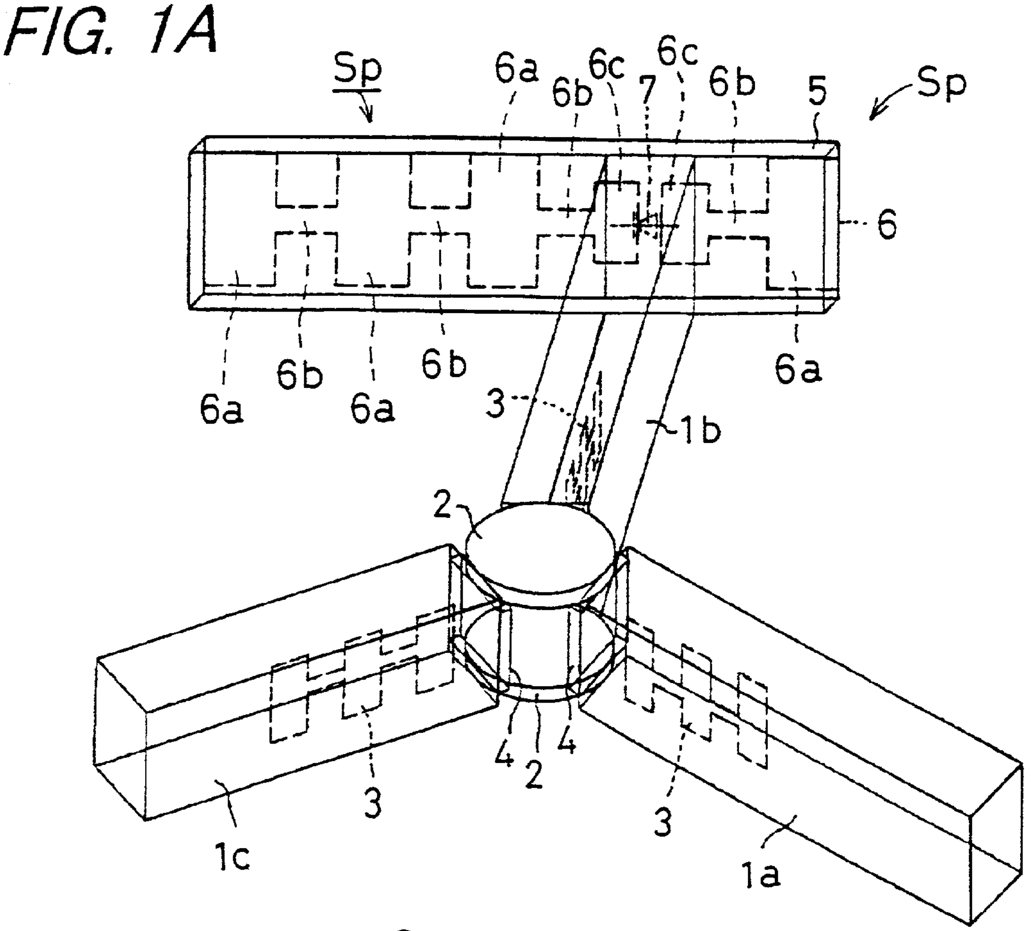
FIG. 1A is a perspective view of a pulse modulator for an NRD guide according to one embodiment of the present invention.

Now referring to the drawings, preferred embodiments of the invention are described below.

Figure 1B:
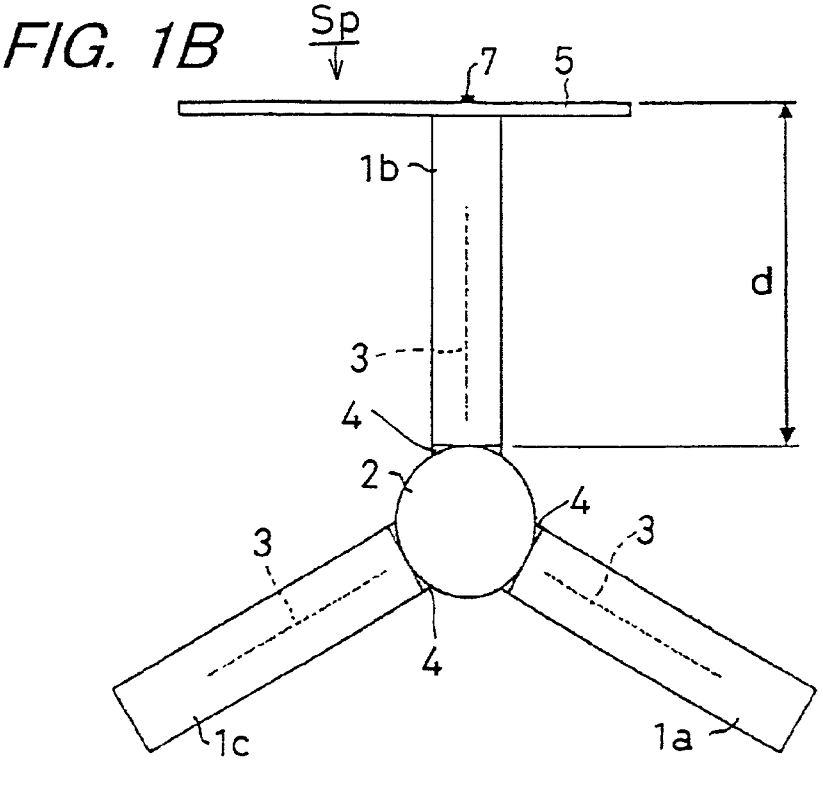
FIG. 1B is a plan view of the pulse modulator as seen from above.

A pulse modulator for an NRD guide according to the present invention, and a millimeter wave radar module as a millimeter wave transmitter/receiver using the same will be described below. FIG. 1A is a perspective view of the pulse modulator of the invention, and FIG. 1B is a plan view of the pulse modulator of the invention as seen from above. In both figures, parallel plate conductors are not shown.

As shown, the pulse modulator of the present invention comprises parallel plate conductors (not shown), mode suppressors 1*a*, 1*b*, and 1*c*, two ferrite disks 2 for a circulator, strip line conductors 3, impedance matching members 4, and a pulse modulation switch Sp. The mode suppressors 1*a*, 1*b*, and 1*c* are each constructed from a dielectric waveguide, made of Teflon, polystyrene, cordierite ($2MgO.2Al_2O_3.5SiO_2$) ceramics, glass ceramics, or like material, that transmits LSM mode electromagnetic waves and shuts off LSE mode electromagnetic waves. The mode suppressors 1*a*, 1*b*, and 1*c*, each connected at one end to the two ferrite disks 2 that form the circulator, are arranged spaced 120 degrees apart from each other and extending radially from the ferrite disks 2. The strip line conductors 3, made of copper foil or the like, are formed inside the mode suppressors 1*a*, 1*b*, and 1*c*, and shut off LSE mode electromagnetic waves in which the direction of the electric field is perpendicular to the principal surfaces of the parallel plate conductors (in FIG. 1A, the direction from top to bottom). Further, each strip line conductor 3 is formed with a λ/4 choke pattern in order to eliminate TEM mode. The impedance matching members 4 are mounted on the end faces of the mode suppressors 1*a*, 1*b*, and 1*c* that are connected to the ferrite disks 2.

At the other end face of the mode suppressor 1*b*, i.e., the opposite side from the ferrite disk side, is provided the pulse modulation switch Sp. The pulse modulation switch Sp comprises a dielectric wiring substrate 5, a choke-type bias supply line 6, and a Schottky barrier diode 7. The choke-type bias supply line 6 is formed on the dielectric wiring substrate 5. The Schottky barrier diode 7 of beam-lead or flip-chip type is connected by soldering or thermal compression to an intermediate point of the choke-type bias supply line 6. The pulse modulation switch Sp is mounted on the opposite end face of the mode suppressor 1*b* in such a manner that the direction of the bias voltage applied to the Schottky barrier diode 7 coincides with the direction of electric field of the LSM mode electromagnetic wave.

Figure 2:
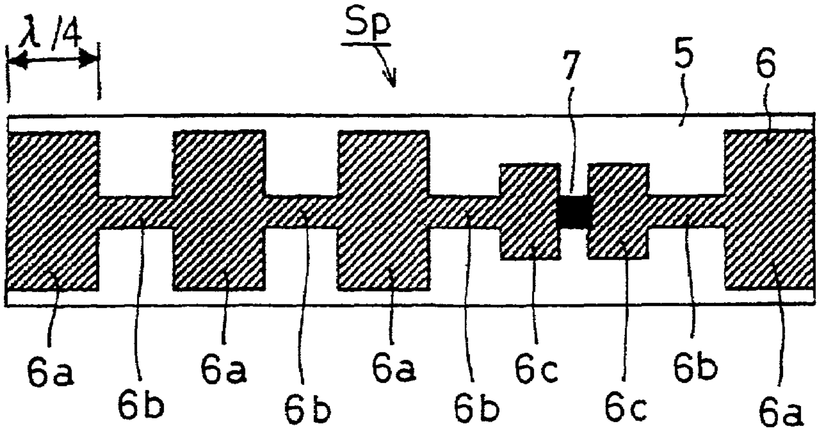
FIG. 2 is a plan view showing a dielectric wiring substrate with a Schottky barrier diode mounted thereon.

FIG. 2 is a plan view showing the dielectric wiring substrate 5 of the pulse modulation switch Sp. The choke-type bias supply line 6 has a choke pattern with wide portions 6*a* of λ/4 alternating with narrow portions 6*b* of λ/4. The connecting portions 6*c* of the choke-type bias supply line 6 at which the Schottky barrier diode 7 is connected have a width intermediate between that of the wide portion 6*a* and that of the narrow portion 6*b*.

The distance d from the edge of the ferrite disks 2 to the Schottky barrier diode 7 is set approximately equal to nλ/2 (where n is an integer not smaller than 1, and λ is the wavelength of the high frequency signal); this facilitates impedance matching and makes it possible to perform ASK modulation at the desired frequency.

In the pulse modulator, the electromagnetic wave propagated through the mode suppressor 1*a* is passed between the ferrite disks 2 where the wavefront is rotated in the clockwise direction so that the electromagnetic wave is directed into the mode suppressor 1*b*, not into the mode suppressor 1*c*. When a forward bias is applied to the Schottky barrier diode 7, the electromagnetic wave propagated through the mode suppressor 1*b* is not reflected but absorbed at the Schottky barrier diode 7 mounted on the dielectric wiring substrate 5 at the opposite end of the mode suppressor 1*b*. As a result, no output is produced from the mode suppressor 1*c*. In this case, when the distance d from the edge of the ferrite disks 2 to the Schottky barrier diode 7 is set approximately equal to nλ/2 (n is an integer not smaller than 1), the electric field becomes the greatest at the position of the Schottky barrier 7 at the frequency of the wavelength λ, so that the electromagnetic wave is absorbed most effectively. As a result, impedance matching can be achieved at the desired frequency, making good ASK modulation possible.

On the other hand, when no bias or a reverse bias is applied to the Schottky barrier diode 7, the electromagnetic wave is reflected. The reflected electromagnetic wave is propagated back through the mode suppressor 1*b* and passed between the ferrite disks 2 where the wavefront is rotated in the clockwise direction so that the electromagnetic wave is directed into the mode suppressor 1*c* which thus produces an output.

By controlling the bias voltage applied to the Schottky barrier diode 7 as described above, ASK modulation can be applied to the electromagnetic wave.

In the present invention, the two ferrite disks 2 of identical shape are mounted concentrically and opposite each other on the inner surfaces of the respective parallel plate conductors. More specifically, the principal surfaces of the ferrite disks are in contact with the inner surfaces of the respective parallel plate conductors. Alternatively, the ferrite disks may be arranged spaced a prescribed displace away from the inner surfaces of the respective parallel plate conductors. In FIG. 1A, the principal surfaces of the mode suppressors 1*a*, 1*b*, and 1*c* are flush with the principal surfaces of the two ferrite disks 2, and are in contact with the inner surfaces of the parallel plate conductors; this structure is preferred in order to reduce the transmission loss of the high frequency signal.

As for the thicknesses of the ferrite disks 2, when using a ferrite having a dielectric constant of 13 in the 77 GHz band used by automotive millimeter wave radars, the thickness of each ferrite disk 2 should be set within the range of 0.15 mm to 0.30 mm; if it is thinner than 0.15 mm, the strength of the ferrite disk 2 decreases, and its handling becomes difficult. On the other hand, if it is thicker than 0.30 mm, its diameter must be made smaller in order to prevent the deviation of the pass band, and if the diameter is made smaller, the isolation of the circulator degrades, and the electromagnetic wave leaks from the mode suppressor 1*a* into the mode suppressor 1*c*, resulting in degradation of the ASK modulation characteristic.

The diameter of the ferrite disk 2 should be set within the range of 1 mm to 3 mm; if it is made smaller than 1 mm, the isolation of the circulator degrades, and if it is made larger than 3 mm, the thickness must be made thinner to prevent the deviation of the pass band, but in that case, the thickness becomes smaller than 0.15 mm, making its handling difficult.

Instead of the ferrite disks 2, ferrite plates of regular polygon shape may be used; in that case, when the number of dielectric waveguides (mode suppressors) connected to them is m (m is an integer not smaller than 2), the planar shape of each ferrite plate is a regular k-gon (where k is an integer not smaller than 3). When a permanent magnet or an electromagnet is provided that applies a DC magnetic field of about 355,500 A/m from the outside of the parallel plate conductors to the principal surfaces of the ferrite disks 2, the ferrite disks 2 function as a circulator.

In the present invention, the mode suppressors 1*a* to 1*c* are arranged extending substantially radially from the ferrite disks 2. The three mode suppressors 1*a* to 1*c* are equally spaced apart with each waveguide making an angle of 120 degrees with each of the other waveguides, but alternatively, two mode suppressors may be provided equally spaced apart from each other by 120 degrees; in the latter case, the transmission line of the high frequency signal is changed in only one direction. In the configuration of FIG. 1A, the transmission line can be changed in three directions, that is, from the mode suppressor 1*a* to the mode suppressor 1*b*, from the mode suppressor 1*b* to the mode suppressor 1*c*, and from the mode suppressor 1*c* to the mode suppressor 1*a*. It is also possible to provide four mode suppressors spaced 90 degrees apart or six mode suppressors spaced 60 degrees apart.

The impedance matching members 4 of the present invention each have a dielectric constant different from that of each of the mode suppressors 1*a* to 1*c*, and when the dielectric constant of each of the mode suppressors 1*a* to 1*c* is denoted by $\in r1$, and that of each impedance matching member 4 by $\in r2$, it is preferable that the relation $-10 \leqq (\in r2-\in r1) \leqq 20$ $(\in r2 \neq \in r1)$ hold between them. If $(\in r2-\in r1) < -10$, the waveguide width of the impedance matching member 4 becomes small, and its handling becomes difficult, as a result of which its positioning accuracy degrades, tending to cause variations in transmission loss from product to product. If $20 < (\in r2-\in r1)$, the need arises to reduce the length of the impedance matching member 4 in the transmission direction in order to achieve impedance matching, and its handling becomes difficult, as a result of which its geometrical accuracy drops, tending to cause variations in transmission loss from product to product. If $\in r2 = \in r1$, the reflection of the high frequency signal increases, making it difficult to achieve impedance matching.

It is also preferable that the thickness of the impedance matching member 4 in the transmission direction be set within the range of 0.05 mm to 0.5 mm; if it is thinner than 0.05 mm, its handling becomes difficult, and its geometrical accuracy drops, tending to cause variations in transmission loss from product to product. If it is thicker than 0.5 mm, the isolation characteristic of the circulator degrades.

The impedance matching members 4 should be formed from a ceramic material such as alumina ceramics whose dielectric constant is relatively high at about 9.7, forsterite ($2MgO.SiO_2$) ceramics having a dielectric constant of 7, spinel ($MgO.Al_2O_3$) ceramics having a dielectric constant of about 8, or from such ceramics material as a mullite ($3Al_2O_3.2SiO_2$) ceramics or silicon nitride ($Si_3N_4$) ceramics; these materials have low transmission loss and excellent strength.

The high frequency band mentioned in this invention refers to the microwave band or millimeter wave band in the frequency range of tens to hundreds of GHz, for example, a band of frequencies higher than 30 GHz, and more particularly, a band of frequencies higher than 50 GHz, and preferably, higher than 70 GHz.

The parallel plate conductors for the NRD guide of the invention may each be formed from an electrically conductive plate made of such material as Cu, Al, Fe, Ag, Au, Pt, SUS (stainless steel), or brass (Cu—Zn alloy) because of their high electrical conductivity and excellent workability, or may be constructed by forming an electrically conductive layer of one of these materials on the surface of an insulating plate made of ceramics, resin, etc.

Figure 3:
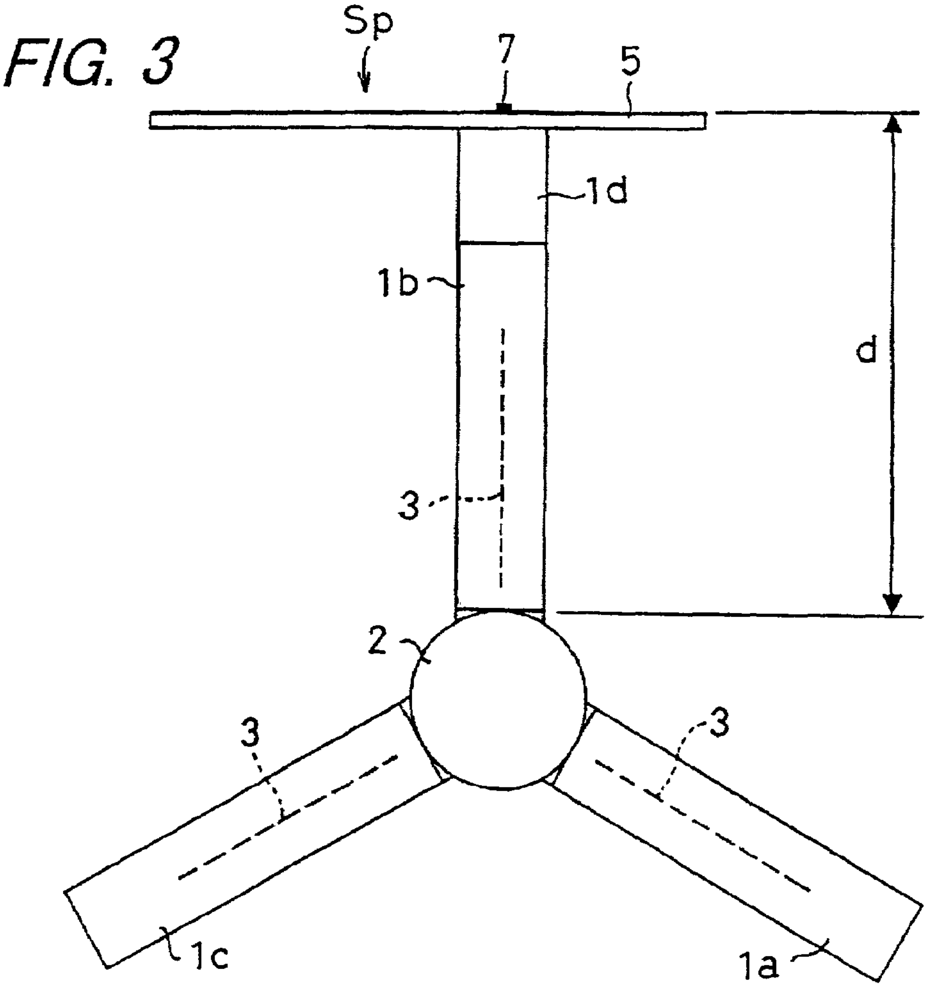
FIG. 3 is a plan view of a pulse modulator for an NRD guide according to another embodiment of the present invention.

FIG. 3 is a plan view of a pulse modulator for an NRD guide according to another embodiment of the present invention. In this embodiment, parts corresponding to those of the embodiment mentioned above are denoted by the same reference numerals and explanations thereof are omitted. In the pulse modulator of the invention, an intermediate dielectric waveguide 1*d* having substantially the same width as that of the mode suppressor 1*b* may be placed between the mode suppressor 1*b* and the pulse modulation switch Sp. This provides greater freedom in controlling the distance from the ferrite plates 2 to the Schottky barrier diode 7, making it possible to readily adapt to operations at various desired frequencies. In this way, in the pulse modulator for the NRD guide of the invention, by setting the distance d between the edge of the ferrite disks 2 and the Schottky barrier diode 7 approximately equal to n $\lambda/2$ (n is an integer not smaller than 1), impedance matching can be easily achieved, and ASK modulation can be performed at the desired frequency.

Figure 4:
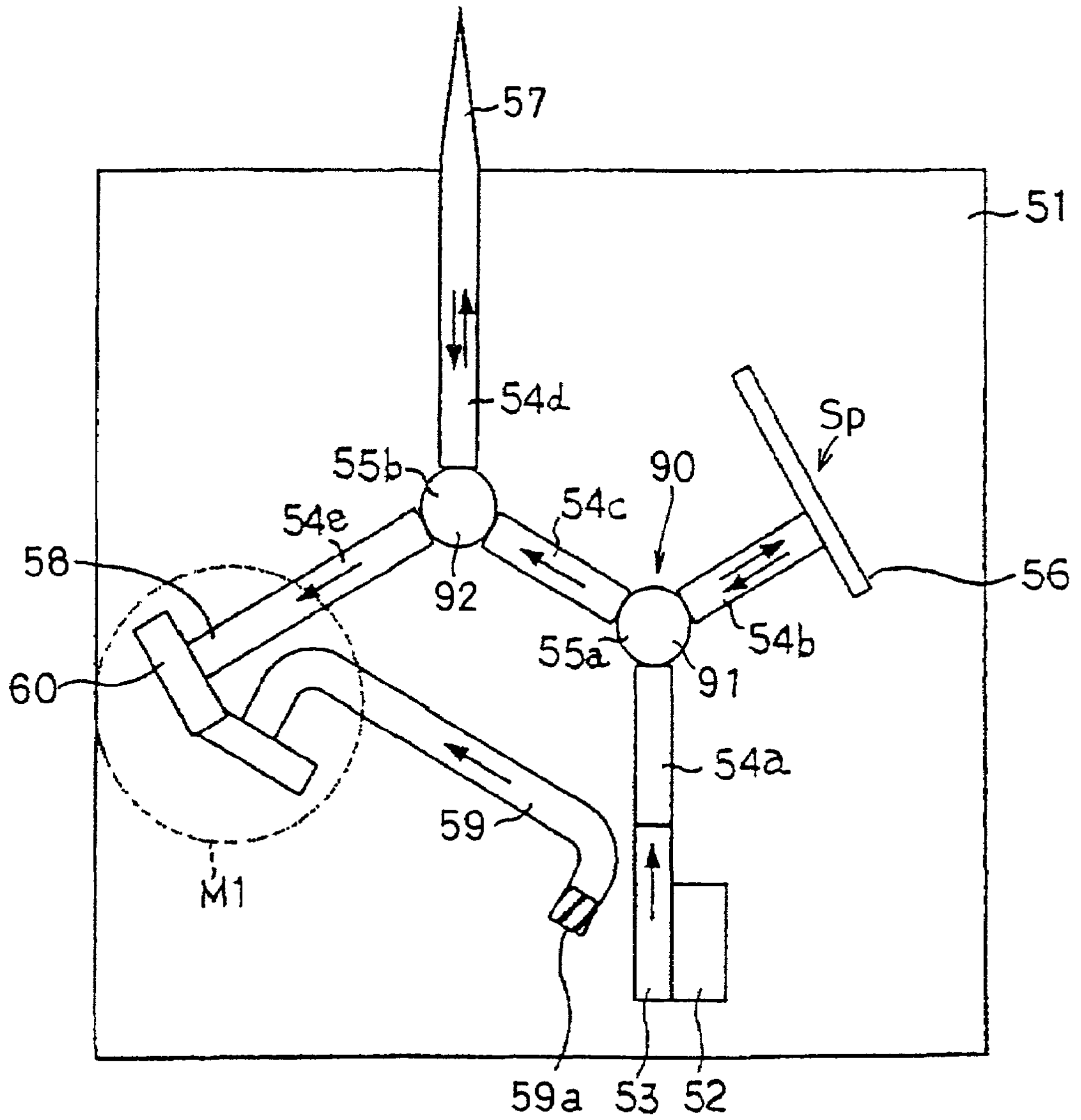
FIG. 4 is a plan view of a millimeter wave radar module according to one embodiment of the present invention.
Figure 5:
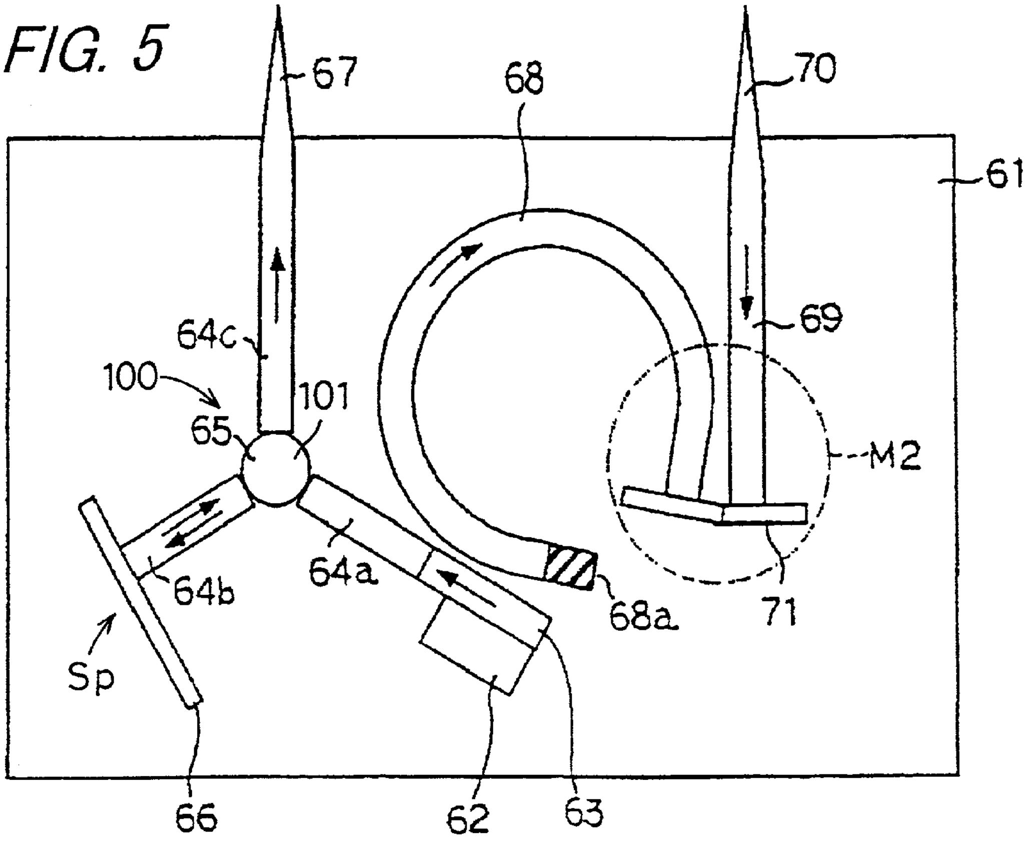
FIG. 5 is a plan view of a millimeter wave radar module according to another embodiment of the present invention.
Figure 6:
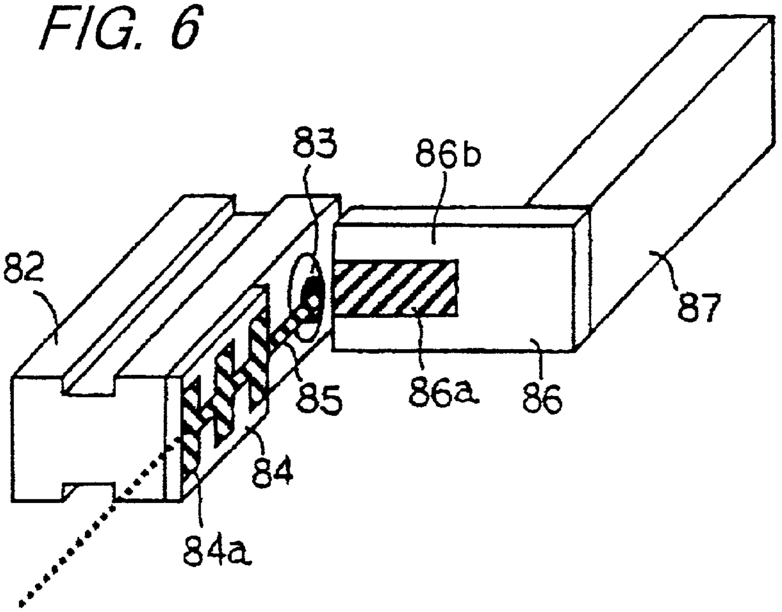
FIG. 6 is a perspective view of a millimeter wave signal oscillator for the millimeter wave radar module of the invention.

Next, the millimeter wave radar module as the millimeter wave transmitter/receiver of the invention will be described below. FIGS. 4 to 6 are diagrams showing the millimeter wave radar module of the invention: FIG. 4 shows a plan view of the millimeter wave radar module where a transmitting antenna and a receiving antenna are combined into one common antenna, FIG. 5 shows a plan view of the millimeter wave radar module where a transmitting antenna and a receiving antenna are provided separately, and FIG. 6 shows a perspective view of a millimeter wave signal oscillator.

In FIG. 4, the millimeter wave radar module comprises a pair of parallel plate conductors, a millimeter wave signal oscillator 52, a first dielectric waveguide 53, a first circulator 55*a*, a dielectric wiring substrate 56, a second circulator 55*b*, a transmitting/receiving antenna 57, a third dielectric waveguide 58, a second dielectric waveguide 59, and a mixer 60. In FIG. 4, of the pair of parallel plate conductors, only one parallel plate conductor 51 is shown, and the other parallel plate conductor is not shown. The millimeter wave signal oscillator 52 is disposed at one end of the first dielectric waveguide 53, and outputs a millimeter wave signal for transmission.

The first dielectric waveguide 53 is a waveguide through which is propagated the millimeter wave signal modulated with a high frequency signal outputted from a high frequency diode such as a Gunn diode used as a high frequency generating device. The first circulator 55*a* is constructed with first, second, and third mode suppressors 54*a*, 54*b*, and 54*c*, and ferrite disks. In the embodiment of the present invention, the mode suppressors 54*a*, 54*b*, and 54*c* are arranged spaced 120 degrees apart circumferentially around the ferrite disks. The first mode suppressor 54*a* is connected to the first dielectric waveguide 53 or is disposed at the end of the first dielectric waveguide 53. The dielectric wiring substrate 56 is mounted with a Schottky barrier diode (not shown) which is connected to the second mode suppressor 54*b* in the first circulator 55*a*. The pulse modulation switch Sp is thus constructed. The pulse modulator 90 of the invention is constructed as described above. The second circulator 55*b* is constructed with third, fourth, and fifth mode suppressors 54*c*, 54*d*, and 54*e*, and ferrite disks. In the embodiment of the present invention, the mode suppressors 54*c*, 54*d*, and 54*e* are arranged spaced 120 degrees apart circumferentially around the ferrite disks. Provided at the opposite end of the fourth mode suppressor 54*d* is the transmitting/receiving antenna 57 whose end has a tapered or like shape.

The received wave, received by the transmitting/receiving antenna 57 and propagated through the fourth mode suppressor 54*d*, is outputted from the fifth mode suppressor 54*e* in the second circulator 55*b* and propagated through the third dielectric waveguide 58 into the mixer 60. The second dielectric waveguide 59 is electromagnetically coupled at one end by proximity to the first dielectric waveguide 53, or is joined at one end to the first dielectric waveguide 53, so as to allow a portion of the millimeter wave signal to be coupled into the mixer 60. The end of the second dielectric waveguide 59 opposite from the mixer 60 is provided with a nonreflecting terminator 59*a*. The section MI shown in the figure indicates the mixer section which generates an intermediate frequency signal by mixing the portion of the millimeter wave signal with the received wave by electromagnetically coupling an intermediate portion of the second dielectric waveguide 59 by proximity to an intermediate portion of the third dielectric waveguide 58 or by joining them together.

The above components are arranged between the parallel plate conductors that are separated from each other by a distance not greater than one half wavelength of the millimeter wave signal.

FIG. 5 shows another embodiment of the millimeter wave radar module of the invention, in which the transmitting antenna and the receiving antenna are provided separately. In FIG. 5, the millimeter wave radar module comprises a pair of parallel plate conductors, a millimeter wave signal oscillator 62, a first dielectric waveguide 63, a circulator 65, a dielectric wiring substrate 66, a transmitting antenna 67, a second dielectric waveguide 68, a third dielectric waveguide 69, a receiving antenna 70, and a mixer 71. In FIG. 5, of the pair of parallel plate conductors, only one parallel plate conductor 61 is shown, and the other parallel plate conductor is not shown. The millimeter wave signal oscillator 62 is disposed at one end of the first dielectric waveguide 63, and outputs a millimeter wave signal for transmission.

The first dielectric waveguide 63 is a waveguide through which is propagated the millimeter wave signal frequency-modulated with a high frequency signal outputted from a high frequency diode. The circulator 65 is constructed with first, second, and third mode suppressors 64*a*, 64*b*, and 64*c*, and ferrite disks. In the embodiment of the present invention, the mode suppressors 64*a*, 64*b*, and 64*c* are arranged spaced 120 degrees apart circumferentially around the ferrite disks. The first mode suppressor 64*a* is connected to the first dielectric waveguide 63. The dielectric wiring substrate 66 is mounted with a Schottky barrier diode (not shown) which is connected to the second mode suppressor 64*b* in the circulator 65. The pulse modulation switch Sp is thus constructed. The pulse modulator of the invention is constructed as described above. The transmitting antenna 67 whose end has a tapered or like shape is connected to the third mode suppressor 64*c* in the circulator 65.

The second dielectric waveguide 68 is electromagnetically coupled at one end by proximity to the first dielectric waveguide 63, or is joined at one end to the first dielectric waveguide 63, so as to allow a portion of the millimeter wave signal to be coupled into the mixer 71. The end of the second dielectric waveguide 68 opposite from the mixer 71 is provided with a nonreflecting terminator 68*a*. The received wave received by the receiving antenna 70 is propagated through the third dielectric waveguide 69 into the mixer 71. The section M2 shown in the figure indicates the mixer section which generates an intermediate frequency signal by mixing the portion of the millimeter wave signal with the received wave by electromagnetically coupling an intermediate portion of the second dielectric waveguide 68 by proximity to an intermediate portion of the third dielectric waveguide 69 or by joining them together.

The above components are arranged between the parallel plate conductors that are separated from each other by a distance not greater than one half wavelength of the millimeter wave signal.

In the above millimeter wave radar modules, the spacing between the parallel plate conductors is set not larger than one half wavelength of the millimeter wave signal in the air, i.e., one half the wavelength at the operating frequency.

The millimeter wave signal oscillator 52, 62 for the millimeter wave radar module in FIGS. 4 and 5 is shown in FIG. 6. The millimeter wave signal oscillator comprises a metal member 82, a Gunn diode 83, a wiring substrate 84, a strip conductor 85, a metal strip resonator 86, and a dielectric waveguide 87. The metal member 82 is a metal block or the like for mounting the Gunn diode 83 thereon. The Gunn diode 83 is a kind of high frequency diode that generates a millimeter wave. The wiring substrate 84 is mounted on one side face of the metal member 82. A choke-type bias supply line 84*a* that supplies a bias voltage to the Gunn diode 83, and that functions as a low pass filter to prevent leakage of the high frequency signal, is formed on the wiring substrate 84. The strip conductor 85 is formed from a metal foil ribbon or the like, and connects between the choke-type bias supply line 84*a* and an upper conductor of the Gunn diode 83. The metal strip resonator 86 is constructed by forming a resonant metal strip line 86*a* on a dielectric substrate 86*b*. The dielectric waveguide 87 guides the high frequency signal, produced by the resonance of the metal strip resonator 86, to the outside of the millimeter wave oscillator.

The millimeter wave radar modules of FIGS. 4 and 5 both employ a pulse method, the operating principle of which is as follows. The millimeter wave signal outputted from the millimeter wave signal oscillator is fed into the pulse modulator of the invention where pulse modulation is applied to the millimeter wave signal by applying a pulse voltage to a modulating signal input MODIN terminal. Then, when the output signal (transmitted wave) is radiated by the transmitting/receiving antenna 57 or the transmitting antenna 67, if there is a target in the radiating direction of the transmitting/receiving antenna 57 or the transmitting antenna 67, the wave is reflected and received with a time delay equal to the round trip time of the wave, and the received wave is outputted at an IFOUT terminal on the output side of the mixer 60 or 71.

Using the delay time t of the output of the IFOUT terminal with respect to the transmitted pulse, the range to the target can be obtained from the relation $R=ct/2$ (c: Velocity of light).

In the millimeter wave signal oscillator of the invention, the choke-type bias supply line 84*a* and the strip conductor 85 are formed of such materials as Cu, Al, Au, Ag, W, Ti, Ni, Cr, Pd, Pt, or the like, among which Cu and Ag are preferred because they have good electrical conductivity, low loss, and large oscillation output.

The strip conductor 85 is electromagnetically coupled to the metal member 82 with a prescribed gap provided between it and the surface of the metal member 82, and runs between the choke-type bias supply line 84*a* and the Gunn diode device 83. More specifically, one end of the strip conductor 85 is connected to one end of the choke-type bias supply line 84*a* by soldering or the like, while the other end of the strip conductor 85 is connected to the upper conductor of the Gunn diode device 83 by soldering or the like, and the intermediate portion of the strip conductor 85 between the connected ends is floating in midair.

The metal member 82 need only be formed of a metal conductor material as it also serves to electrically ground the Gunn diode device 83, and its material is not specifically limited as long as it is formed of a metal conductor material (including an alloy); for example, use can be made of brass (Cu—Zn alloy), Al, Cu, SUS (stainless steel), Ag, Au, Pt, or the like. Instead of forming it of an all-metal block, the metal member 82 may be constructed by applying metal plating partially or entirely on the surface of an insulating substrate of ceramics, plastics, or like material, or by coating the surface of an insulating substrate partially or entirely with an electrical conductive resin material or the like.

Thus, the millimeter wave radar module as the millimeter wave transmitter/receiver of the present invention provides improved isolation characteristics for pulse modulation of millimeter wave signals. Accordingly, when the invention is applied to the millimeter wave radar module, noise in the received signal is reduced, achieving good millimeter wave transmission characteristics; as a result, the detection range of the millimeter wave radar can be extended (in the case of the millimeter wave radar module of FIG. 4). Likewise, isolation characteristics for pulse modulation of millimeter wave signals are improved, and the millimeter wave signal to be transmitted is prevented from being introduced into the mixer via the circulator. As a result, noise in the received signal is reduced, so that the detection range of the millimeter radar can be further extended (in the case of the millimeter wave radar module of FIG. 5).

The present invention is not limited to the above described embodiments, and it should be understood that various modifications can be made without departing from the scope and spirit of the invention.

A working example of the pulse modulator for the NRD guide according to the present invention will be described below.

Working Example

The pulse modulator of FIG. 1 was constructed as described below. Two Al plates, each with a thickness of 6 mm, were arranged as parallel plate conductors, one separated from the other by a distance of 1.8 mm. Three mode suppressors 1*a* to 1*c*, each having a rectangular cross section of 1.8 mm (height)×0.8 mm (width) and made of glass ceramics having a dielectric constant of 4.8, were connected to two ferrite disks 2, and were placed between the parallel plate conductors, the mode suppressors being arranged extending radially and spaced 120 degrees apart from each other. The mode suppressors 1*a* to 1*c* each contain a strip line conductor 3 made of Cu foil formed in a λ/4 choke pattern.

At this time, the upper and lower surfaces of each of the mode suppressors 1*a* to 1*c* were made flush with the principal surfaces of the two ferrite disks 2. More specifically, the two ferrite disks 2 were arranged opposite each other on the inner surfaces of the respective parallel plate conductors, with a step substantially equal to the thickness of each ferrite disk 2 created above and below each impedance matching member 4.

Each of the ferrite disks 2 was 2.0 mm in diameter and 0.21 mm in thickness, and a magnet for applying a DC magnetic field of 355,500 A/m was mounted above and below the ferrite disks 2. More specifically, a circular recess 12.5 mm in diameter and 5 mm in depth was formed concentric with the ferrite disk 2, in the portion of the outer surface of each parallel plate conductor that corresponds to the position of the ferrite disk 2, and a circular magnet 4.5 mm in thickness and 12.5 mm in diameter was mounted in the recess. Each impedance matching member 4 was formed of alumina ceramics having a dielectric constant of 9.7; its cross section cut along a plane perpendicular to the transmission direction was rectangular in shape measuring 1.38 mm in height and 0.8 mm in width, and its length (width) in the transmission direction was 0.1 mm. Accordingly, each step was formed to a depth of 0.21 mm.

The mode suppressor 1*b* is 5.5 mm long, and at its opposite end is mounted the dielectric wiring substrate 5 formed of glass epoxy resin of thickness 0.2 mm. The choke-type bias supply line 6 is printed on the reverse side of the dielectric wiring substrate 5 (the side opposite from the mode suppressor 1*b*). The choke-type bias supply line 6 has wide line portions and narrow line portions; the length of each wide line portion 6*a* is λ/4=0.70 mm (the wavelength becomes shorter on the dielectric substrate), and the length of each narrow line portion 6*b* is also λ/4=0.70 mm, while the width of each wide line portion 6*a* is 1.5 mm, and the width of each narrow line portion 6*b* is 0.2 mm. The Schottky barrier diode 7 of beam lead type is mounted by soldering to the choke-type bias supply line 6. The distance d from the edge of the ferrite disks 2 to the Schottky barrier diode 7 is 5.7 mm which is approximately equal to the guide wavelength in the mode suppressor 1*b* (the guide wavelength in the mode suppressor at 76.5 GHz is 5.8 mm).

Figure 7:
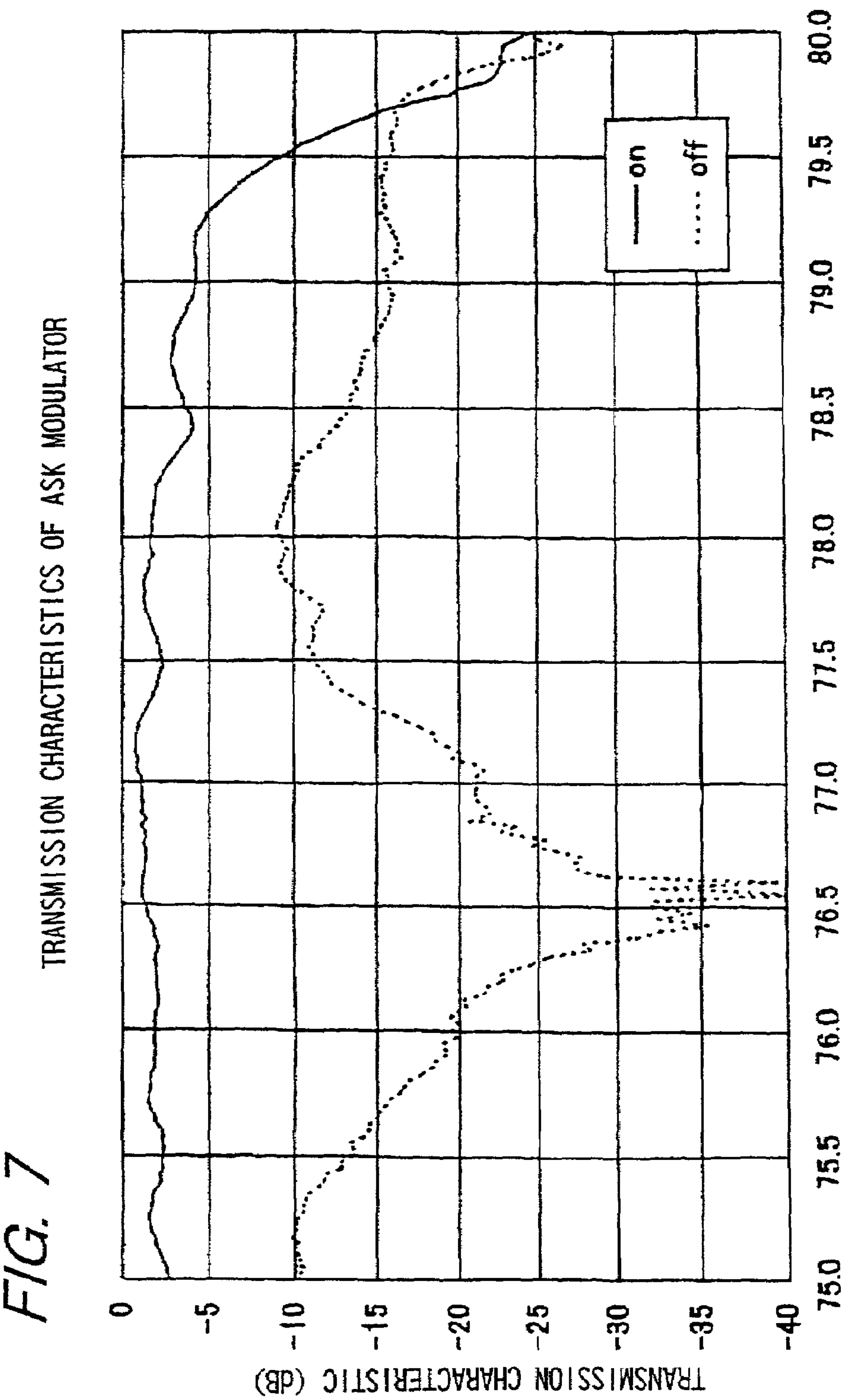
FIG. 7 is a graph showing the measured results representing the high frequency signal transmission characteristics of the pulse modulator of the invention.
Figure 8:
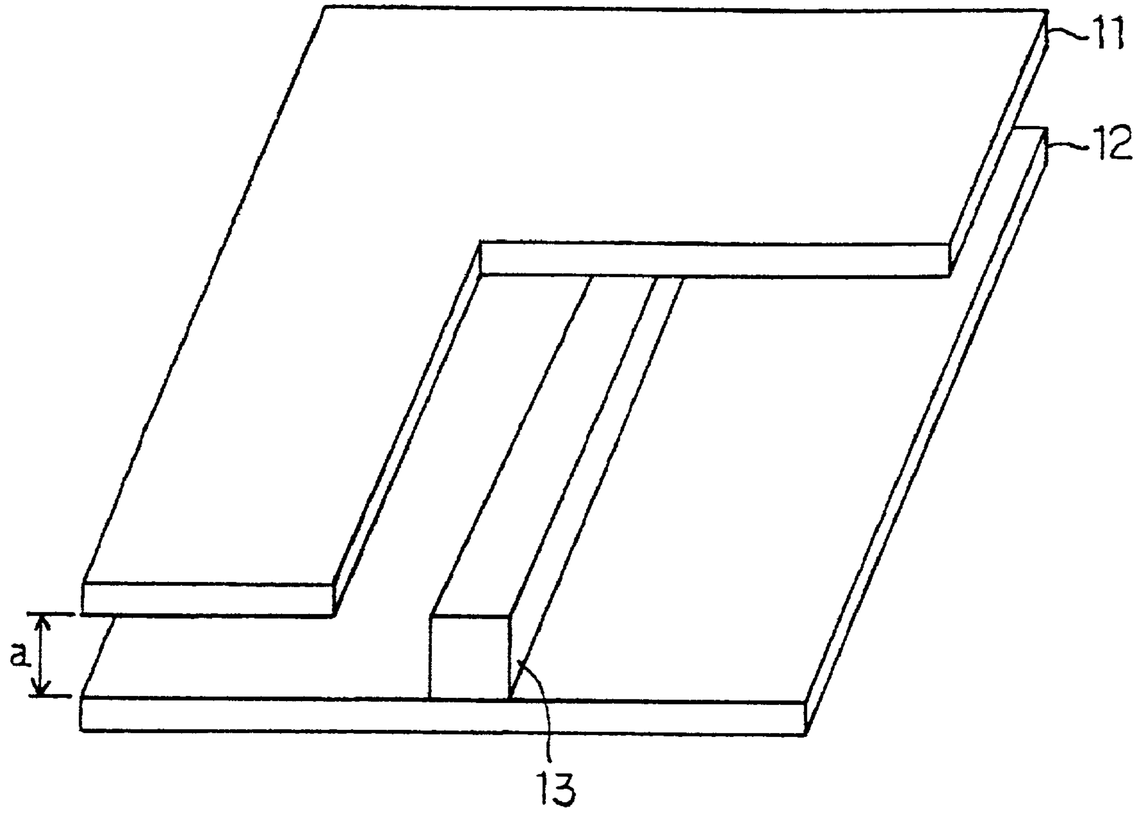
FIG. 8 PRIOR ART
FIG. 8 is a partially cutaway perspective view showing the basic structure of an NRD guide.
Figure 9A:
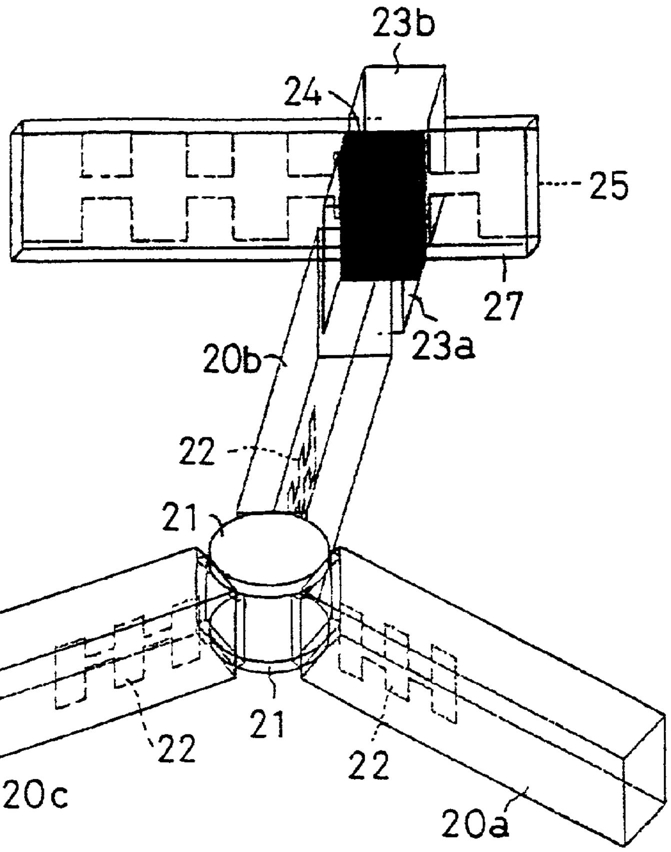
FIG. 9A PRIOR ART
FIG. 9A is a perspective view of a pulse modulator for an NRD guide according to the prior art.
Figure 9B:
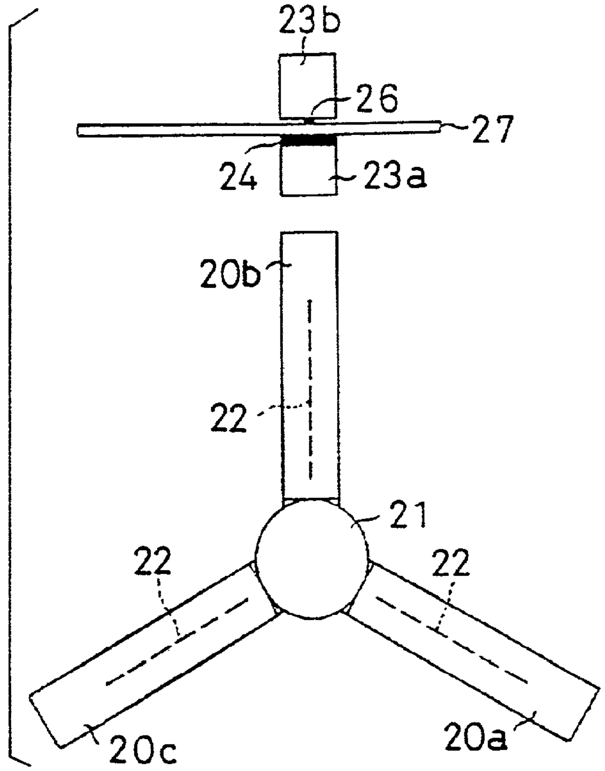
FIG. 9B PRIOR ART
FIG. 9B shows a plan view of the pulse modulator as seen from above.

For the pulse modulator of the above construction, high frequency signal transmission characteristics in the high frequency region of 75 GHz to 80 GHz were measured using a spectrum analyzer for the case where a forward bias was applied to the Schottky barrier diode (OFF state in which the high frequency signal is absorbed and therefore not outputted), and for the case where a reverse bias was applied to it (ON state in which the high frequency signal is reflected and therefore outputted via the circulator). The results are shown in FIG. 7.

In the above example, the target frequency is at 76.5 GHz±0.5 GHz. As can be seen from the transmission characteristics shown in FIG. 7, in the ON state the loss is extremely low at about −1 to −2 dB in the above frequency region. As for the isolation characteristics in the ON and OFF states, −18 dB or higher isolation was obtained over the entire region of the above frequencies, and in the highest isolation region, the isolation characteristic showed an extremely good value of about −30 dB. The frequency in the highest isolation region coincides with the target frequency of 76.5 GHz, from which it can be seen that at this frequency, the best matching is achieved and the high frequency signal is effectively absorbed by the Schottky barrier diode 7.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A pulse modulator for a nonradiative dielectric waveguide, comprising:

parallel plate conductors one separated from the other by a distance not greater than one half wavelength of a high frequency signal;

a circulator placed between the parallel plate conductors, the circulator including two ferrite plates disposed opposite each other on inner surfaces of the parallel plate conductors, a plurality of mode suppressors, each constructed from a dielectric waveguide for transmitting therethrough an LSM mode electromagnetic wave while shutting off an LSE mode electromagnetic wave, and arranged in such a manner as to extend substantially radially from the two ferrite plates, and an impedance matching member mounted on one end face of each of the mode suppressors and having a dielectric constant different from that of the dielectric waveguide; and a pulse modulation switch constructed from a Schottky barrier diode connected at an intermediate point along a choke-type bias supply line formed on a dielectric wiring substrate, the pulse modulation switch being mounted on the other end face of any one of the mode suppressors in such a manner that a direction of application of a bias voltage to the Schottky barrier diode coincides with a direction of electric field of the LSM mode electromagnetic wave, wherein a distance from an edge of each of the ferrite plates to the Schottky barrier diode is set approximately equal to $n\lambda/2$ where n is an integer not smaller than 1, and $\lambda$ is the wavelength of the high frequency signal.

2. The pulse modulator of claim 1, wherein an intermediate dielectric waveguide having substantially the same width as that of the mode suppressor is placed between the mode suppressor and the pulse modulation switch.

3. The pulse modulator of claim 1, wherein the dielectric waveguide and the impedance matching member have a relation defined by $-10 \leqq (\in r2 - \in r1) \leqq 20$ ($\in r1 \neq \in r2$), where $\in r1$ is the dielectric constant of the dielectric waveguide and $\in r2$ is the dielectric constant of the impedance matching member.

4. The pulse modulator of claim 1, wherein a thickness of the impedance matching member, measured along the direction of transmission of the high frequency signal, is 0.05 mm to 0.5 mm.

5. The pulse modulator of claim 1, wherein the impedance matching member is formed of at least one selected from the group consisting of alumina ceramics, forsterite ceramics, spinel ceramics, mullite ceramics, and silicon nitride ceramics.

6. A millimeter wave transmitter/receiver, wherein, between parallel plate conductors one separated from the other by a distance not greater than one half wavelength of a millimeter wave signal to be transmitted, there are provided:

a first dielectric waveguide for propagating the millimeter wave signal therethrough;

a millimeter wave signal oscillator, attached to the first dielectric waveguide, for generating the millimeter wave signal using a high frequency generating device, and for propagating the millimeter wave signal into the first dielectric waveguide;

a second dielectric waveguide whose one end is electromagnetically coupled by proximity to the first dielectric waveguide, or is joined to the first dielectric waveguide, thereby propagating a portion of the millimeter wave signal into a mixer;

a circulator having a first connection part, a second connection part, and a third connection part provided as input/output ends for the millimeter wave signal and arranged at prescribed intervals around ferrite plates mounted parallel to the parallel plate conductors, the circulator having a function of directing the millimeter wave signal inputted through one of the connection parts, into another one of the connection parts that is adjacent in clockwise or counterclockwise direction in a plane of the ferrite plates, wherein the first connection part is connected to the output end of the first dielectric waveguide at which the millimeter wave signal is outputted;

a third dielectric waveguide, connected to the second connection part of the circulator, for propagating the millimeter wave signal therethrough, the third dielectric waveguide having a transmitting/receiving antenna at an end portion thereof;

a fourth dielectric waveguide for propagating into the mixer a received wave received by the transmitting/receiving antenna, propagated through the third dielectric waveguide, and outputted through the third connection part of the circulator; and a mixer section for generating an intermediate frequency signal by mixing a portion of the millimeter wave signal with the received wave, the mixer section being constructed by electromagnetically coupling an intermediate portion of the second dielectric waveguide by proximity to an intermediate portion of the fourth dielectric waveguide or by joining the second and fourth dielectric waveguides together, wherein the pulse modulator of claim 1 is placed between the circulator and a signal coupling portion of the first dielectric waveguide from which the portion of the millimeter wave signal is coupled into the second dielectric waveguide.

7. A millimeter wave transmitter/receiver, comprising:

a pair of parallel plate conductors one separated from the other by a distance not greater than one half wavelength of a millimeter wave signal to be transmitted;

a first dielectric waveguide for propagating the millimeter wave signal therethrough;

a millimeter wave signal oscillator, attached to the first dielectric waveguide, for generating the millimeter wave signal using a high frequency generating device, and for propagating the millimeter wave signal into the first dielectric waveguide;

a second dielectric waveguide whose one end is electromagnetically coupled by proximity to the first dielectric waveguide, or is joined to the first dielectric waveguide, thereby propagating a portion of the millimeter wave signal into a mixer;

a pulse modulator for a nonradiative dielectric waveguide, including:

a first circulator constructed with two ferrite plates disposed opposite each other on inner surfaces of the parallel plate conductors, a plurality of mode suppressors, each constructed from a dielectric waveguide for transmitting therethrough an LSM mode electromagnetic wave while shutting off an LSE mode electromagnetic wave, and arranged in such a manner as to extend substantially radially from the two ferrite plates, and an impedance matching member mounted on one end face of each of the mode suppressors and having a dielectric constant different from that of the dielectric waveguide, the first circulator having a function of directing the millimeter wave signal inputted from one of the mode suppressors, into another one of the mode suppressors that is adjacent in clockwise or counterclockwise direction in a plane of the ferrite plates, and a pulse modulation switch comprising a dielectric wiring substrate, a choke-type bias supply line formed on the dielectric wiring substrate, and a Schottky barrier diode connected to an intermediate point of the choke-type bias supply line, wherein the first dielectric waveguide is connected to a first mode suppressor of the plurality of mode suppressors of the first circulator at a position on the downstream side, as viewed in signal propagation direction, of a signal coupling portion where the portion of the millimeter wave signal is coupled into the second dielectric waveguide, and the pulse modulation switch is mounted on the farthest end face of a second mode suppressor of the plurality of mode suppressors of the first circulator in such a manner that a direction of application of a bias voltage to the Schottky barrier diode coincides with a direction of electric field of the LSM mode electromagnetic wave, and that the distance from an edge of the ferrite plates to the Schottky barrier diode is approximately equal to $n\lambda/2$ where n is an integer not smaller than 1, and $\lambda$ is the wavelength of the high frequency signal;

a second circulator constructed with two ferrite plates disposed opposite each other on the inner surfaces of the parallel plate conductors, a plurality of mode suppressors, each constructed from a dielectric waveguide for transmitting therethrough an LSM mode electromagnetic wave while shutting off an LSE mode electromagnetic wave, and arranged in such a manner as to extend substantially radially from the two ferrite plates, and an impedance matching member mounted on one end face of each of the mode suppressors and having a dielectric constant different from the dielectric constant of the dielectric waveguide, the second circulator having a function of directing the millimeter wave signal inputted from one of the mode suppressors, into another one of the mode suppressors that is adjacent in clockwise or counterclockwise direction in the plane of the ferrite plates, wherein one of the plurality of mode suppressors of the second circulator is a third mode suppressor of the plurality of mode suppressors of the first circulator;

a transmitting/receiving antenna, connected to a fourth mode suppressor of the plurality of mode suppressor of the second circulator, for propagating the millimeter wave signal therethrough for transmission or reception of the millimeter wave signal, the fourth mode suppressor being another one of the plurality of mode suppressors of the second circulator;

a third dielectric waveguide for propagating into the mixer a received wave received by the transmitting/receiving antenna, propagated through the fourth dielectric waveguide, and outputted from a fifth mode suppressor of the plurality of mode suppressor of the second circulator, the fifth mode suppressor being another one of the plurality of mode suppressors in the second circulator; and a mixer section for generating an intermediate frequency signal by mixing the portion of the millimeter wave signal with the received wave, the mixer section being constructed by electromagnetically coupling an intermediate portion of the second dielectric waveguide by proximity to an intermediate portion of the third dielectric waveguide or by joining the second and third dielectric waveguides together, wherein the first dielectric waveguide, the millimeter wave signal oscillator, the second dielectric waveguide, the pulse modulator, the second circulator, the third dielectric waveguide, and the mixer section are arranged between the parallel plate conductors.

8. The millimeter wave transmitter/receiver of claim 7, wherein in the pulse modulator, an intermediate dielectric waveguide having substantially the same width as that of the mode suppressor is placed between the mode suppressor and the pulse modulation switch.

9. The millimeter wave transmitter/receiver of claim 7, wherein in the pulse modulator, the dielectric waveguide and the impedance matching member have a relation defined by $-10 \leqq (\in r2 - \in r1) \leqq 20 (\in r1 \neq \in r2)$, where $\in r1$ is the dielectric constant of the dielectric waveguide and $\in r2$ is the dielectric constant of the impedance matching member.

10. The millimeter wave transmitter/receiver of claim 7, wherein in the pulse modulator, a thickness of the impedance matching member, measured along a direction of transmission of the high frequency signal, is 0.05 mm to 0.5 mm.

11. The millimeter wave transmitter/receiver of claim 7, wherein in the pulse modulator, the impedance matching member is formed of at least one selected from the group consisting of alumina ceramics, forsterite ceramics, spinel ceramics, mullite ceramics, and silicon nitride ceramics.

12. A millimeter wave transmitter/receiver, wherein, between parallel plate conductors one separated from the other by a distance not greater than one half wavelength of a millimeter wave signal to be transmitted, there are provided:

a first dielectric waveguide for propagating the millimeter wave signal therethrough;

a millimeter wave signal oscillator, attached to the first dielectric waveguide, for generating the millimeter wave signal using a high frequency generating device, and for propagating the millimeter wave signal into the first dielectric waveguide;

a second dielectric waveguide whose one end is electromagnetically coupled by proximity to the first dielectric waveguide, or is joined to the first dielectric waveguide, thereby propagating a portion of the millimeter wave signal into a mixer;

a circulator having a first connection part, a second connection part, and a third connection part provided as input/output ends for the millimeter wave signal and arranged at prescribed intervals around ferrite plates mounted parallel to the parallel plate conductors, the circulator having a function of directing the millimeter wave signal inputted through one of the connection parts, into another one of the connection parts that is adjacent in clockwise or counterclockwise direction in a plane of the ferrite plates, wherein the first connection part is connected to the output end of the first dielectric waveguide at which the millimeter wave signal is outputted;

a third dielectric waveguide, connected to the second connection part of the circulator, for propagating the millimeter wave signal therethrough, the third dielectric waveguide having a transmitting antenna at an end portion thereof;

a fourth dielectric waveguide having a receiving antenna at an end portion thereof and the mixer at the other end; and a mixer section for generating an intermediate frequency signal by mixing the portion of the millimeter wave signal with the received wave, the mixer section being constructed by electromagnetically coupling an intermediate portion of the second dielectric waveguide by proximity to an intermediate portion of the fourth dielectric waveguide or by joining the second and fourth dielectric waveguides together, wherein the pulse modulator of claim 1 is placed between the circulator and a signal coupling portion of the first dielectric waveguide from which the portion of the millimeter wave signal is coupled into the second dielectric waveguide.

13. A millimeter wave transmitter/receiver, comprising:

a pair of parallel plate conductors one separated from the other by a distance not greater than one half wavelength of a millimeter wave signal to be transmitted;

a first dielectric waveguide for propagating the millimeter wave signal therethrough;

a millimeter wave signal oscillator, attached to the first dielectric waveguide, for generating the millimeter wave signal using a high frequency generating device, and for propagating the millimeter wave signal into the first dielectric waveguide;

a second dielectric waveguide whose one end is electromagnetically coupled by proximity to the first dielectric waveguide, or is joined to the first dielectric waveguide, thereby propagating a portion of the millimeter wave signal into a mixer;

a pulse modulator for a nonradiative dielectric waveguide, including:

a circulator constructed with two ferrite plates disposed opposite each other on inner surfaces of the parallel plate conductors, a plurality of mode suppressors, each constructed from a dielectric waveguide for transmitting therethrough an LSM mode electromagnetic wave while shutting off an LSE mode electromagnetic wave, and arranged in such a manner as to extend substantially radially from the two ferrite plates, and an impedance matching member mounted on one end face of each of the mode suppressors and having a dielectric constant different from that of the dielectric waveguide, the circulator having a function of directing the millimeter wave signal inputted from one of the mode suppressors, into another one of the mode suppressors that is adjacent in clockwise or counterclockwise direction in a plane of the ferrite plates, and a pulse modulation switch comprising a dielectric wiring substrate, a choke-type bias supply line formed on the dielectric wiring substrate, and a Schottky barrier diode connected to an intermediate point of the choke-type bias supply line, wherein the first dielectric waveguide is connected to a first mode suppressor of the plurality of mode suppressors of the circulator at a position on the downstream side, as viewed in signal propagation direction, of a signal coupling portion where the portion of the millimeter wave signal is coupled into the second dielectric waveguide, and the pulse modulation switch is mounted on the farthest end face of a second mode suppressor of the plurality of mode suppressors of the circulator in such a manner that a direction of application of a bias voltage to the Schottky barrier diode coincides with a direction of electric field of the LSM mode electromagnetic wave, and that the distance from an edge of the ferrite plates to the Schottky barrier diode is approximately equal to $n\lambda/2$ where n is an integer not smaller than 1, and $\lambda$ is the wavelength of the high frequency signal;

a transmitting antenna, connected to a third mode suppressor of the plurality of mode suppressors of the circulator, for propagating the millimeter wave signal therethrough for transmission of the millimeter wave signal;

a third dielectric waveguide having a receiving antenna at an end portion thereof and the mixer at the other end; and a mixer section for generating an intermediate frequency signal by mixing the portion of the millimeter wave signal with the received wave, the mixer section being constructed by electromagnetically coupling an intermediate portion of the second dielectric waveguide by proximity to an intermediate portion of the third dielectric waveguide or by joining the second and third dielectric waveguides together, wherein the first dielectric waveguide, the millimeter wave signal oscillator, the second dielectric waveguide, the pulse modulator, the third dielectric waveguide, and the mixer section are arranged between the parallel plate conductors.

14. The millimeter wave transmitter/receiver of claim 13, wherein in the pulse modulator, an intermediate dielectric waveguide having substantially the same width as that of the mode suppressor is placed between the mode suppressor and the pulse modulation switch.

15. The millimeter wave transmitter/receiver of claim 13, wherein in the pulse modulator, the dielectric waveguide and the impedance matching member have a relation defined by $-10 \leqq (\epsilon r2 - \epsilon r1) \leqq 20$ ($\epsilon r1 \neq \epsilon r2$), where $\epsilon r1$ is the dielectric constant of the dielectric waveguide and $\epsilon r2$ is the dielectric constant of the impedance matching member.

16. The millimeter wave transmitter/receiver of claim 13, wherein in the pulse modulator, the thickness of the impedance matching member, measured along a direction of transmission of the high frequency signal, is 0.05 mm to 0.5 mm.

17. The millimeter wave transmitter/receiver of claim 13, wherein in the pulse modulator, the impedance matching member is formed of at least one selected from the group consisting of alumina ceramics, forsterite ceramics, spinel ceramics, mullite ceramics, and silicon nitride ceramics.

* * * * *